(12) United States Patent
Chang et al.

(10) Patent No.: US 12,255,013 B2
(45) Date of Patent: Mar. 18, 2025

(54) FILM PASTING ASSEMBLY AND ASSEMBLING METHOD

(71) Applicant: Lanto Electronic Limited, Kunshan (CN)

(72) Inventors: Yongpeng Chang, Kunshan (CN); Tao Zhou, Kunshan (CN); Xiaoceng Zhou, Kunshan (CN); Hang Cheng, Kunshan (CN)

(73) Assignee: LANTO ELECTRONIC LIMITED, Kunshan (CN)

( * ) Notice: Subject to any disclaimer, the term of this patent is extended or adjusted under 35 U.S.C. 154(b) by 40 days.

(21) Appl. No.: 17/987,385

(22) Filed: Nov. 15, 2022

(65) Prior Publication Data

US 2023/0238176 A1 Jul. 27, 2023

(30) Foreign Application Priority Data

Jan. 25, 2022 (CN) .......................... 202210086291.5

(51) Int. Cl.
*H01F 41/02* (2006.01)
*B32B 7/06* (2019.01)
(Continued)

(52) U.S. Cl.
CPC ............... *H01F 41/02* (2013.01); *B32B 7/06* (2013.01); *B32B 7/12* (2013.01); *B32B 37/12* (2013.01);
(Continued)

(58) Field of Classification Search
None
See application file for complete search history.

(56) References Cited

U.S. PATENT DOCUMENTS

2015/0056395 A1* 2/2015 Lin .......................... B32B 7/06
428/41.7
2016/0009118 A1* 1/2016 Chuang .................... B32B 7/06
428/189

(Continued)

FOREIGN PATENT DOCUMENTS

CN 212187402 U * 12/2020
CN 113105839 A 7/2021
(Continued)

OTHER PUBLICATIONS

CN-113562279-A (machine translation) (Year: 2021).*
CN-212187402-U (machine translation) (Year: 2020).*

*Primary Examiner* — Michael N Orlando
*Assistant Examiner* — Abhishek A Patwardhan
(74) *Attorney, Agent, or Firm* — Birch, Stewart, Kolasch & Birch, LLP

(57) ABSTRACT

The present disclosure relates to a film pasting assembly which comprises a base film provided with an annular first adhesive layer and a second adhesive layer, a first release film comprising a first annular portion and a first handle portion for arranging on the first adhesive layer, and a second release film comprising a second annular portion and a second handle portion for arranging on the second adhesive layer. The inner circumference of the first annular portion is equal to the outer circumference of the second annular portion. The first release film and the second release film may be torn apart respectively for product pasting. The success rate, efficiency of product assembly and yield of products may be improved. The first release film and the second release film may be processed by a same raw material for cost saving.

14 Claims, 7 Drawing Sheets

(51) Int. Cl.
    *B32B 7/12* (2006.01)
    *B32B 37/12* (2006.01)
    *B32B 37/26* (2006.01)

(52) U.S. Cl.
    CPC .......... *B32B 37/26* (2013.01); *B32B 2250/44* (2013.01); *B32B 2307/748* (2013.01); *B32B 2405/00* (2013.01); *B32B 2457/00* (2013.01)

(56) References Cited

U.S. PATENT DOCUMENTS

2016/0043765 A1* 2/2016 Ozeki .................... B32B 27/32
                                                            428/41.8
2017/0361570 A1* 12/2017 Geng ..................... B32B 7/06

FOREIGN PATENT DOCUMENTS

| CN | 113562279 A | * 10/2021 |
| CN | 215991163 U | 3/2022 |
| CN | 216873376 U | 7/2022 |
| CN | 216905251 U | 7/2022 |
| WO | WO 2008/111663 A1 | 9/2008 |

\* cited by examiner

FILM PASTING ASSEMBLY AND ASSEMBLING METHOD

CLAIM OF PRIORITY AND CROSS-REFERENCE TO RELATED APPLICATION(S)

This application claims the benefit of Chinese Patent Application No. 202210086291.5, filed on Jan. 25, 2022, which is incorporated herein by reference in its entirety.

TECHNICAL FIELD

The present disclosure relates to the field of electronic product assembly, particularly to a film pasting assembly and an assembling method.

BACKGROUND

A coil and a magnet of an electronic product are assembled assisted by the film pasting assembly during assembly. The film pasting assembly includes a carrier tape film which is provided with an inner adhesive body and an outer adhesive body. The adhesive bodies are annular. The inner adhesive body is used for bonding the coil, and the outer adhesive body is used for bonding an annular magnet. The two adhesive bodies both are provided with release films. When the coil and the magnet are assembled, the release film on the outer adhesive body may be torn apart first to expose the outer adhesive body so as to mount the annular magnet, and then the release film on the inner adhesive body is torn apart to expose the inner adhesive body so as to mount the coil. However, in design of a current film pasting assembly, the two release films are formed by cutting two raw material film materials respectively, which is not only high in cost. Furthermore, when the release films are arranged on the adhesive bodies, they are at least partially superposed in an axial direction, so that when the release film on the outer adhesive body is torn apart, the release film on the inner adhesive body is torn apart together to affect assembly. Moreover, as it is needed to leave the magnet which is mounted first still for a period of time, and then the coil is mounted, the inner adhesive body left still is in an exposed state to lead to weakening of viscosity easily, which affects assembly of the coil.

SUMMARY

In view of this, the objective of the present disclosure is to provide a film pasting assembly, which may improve the film tearing success rate to provide convenience to product assembly, and may further save the cost as well.

In one aspect, an embodiment of the present disclosure provides a film pasting assembly, where the film pasting assembly includes a base film; a first adhesive layer formed annularly and arranged on the base film; a first release film, comprising a first annular portion and a first handle portion, the first annular portion being adhered to the first adhesive layer, and the first handle portion extending outwards from an outer circumference of the first annular portion; a second adhesive layer arranged on the base film; and a second release film, comprising a second annular portion and a second handle portion, the second annular portion being adhered to the second adhesive layer, and the second handle portion extending inwards from an inner circumference of the second annular portion; the second release film is located on an inner side of the first release film, and a size of an inner circumference of the first annular portion is equal to that of an outer circumference of the second annular portion.

In some embodiments, the second adhesive layer is arranged on the first adhesive layer.

In some embodiments, the size of the inner circumference of the first annular portion is equal to that of the inner circumference of the first adhesive layer, and the size of the outer circumference of the first annular portion is equal to that of the outer circumference of the first adhesive layer.

In some embodiments, the second adhesive layer is formed annularly, and the size of the inner circumference of the second adhesive layer is equal to that of the inner circumference of the second annular portion, and the size of the outer circumference of the second adhesive layer is equal to that of the outer circumference of the second annular portion.

In some embodiments, the second adhesive layer is formed annularly, and the size of the outer circumference of the second adhesive layer is equal to that of the inner circumference of the first adhesive layer.

In some embodiments, the first adhesive layer, the second adhesive layer, the first annular portion and the second annular portion are ring-shaped.

In some embodiments, a thickness of the second adhesive layer is greater than or equal to a thickness of the first adhesive layer.

In some embodiments, a notch is formed at a position where the second handle portion and the second annular portion are connected.

In some embodiments, there are two second handle portions, the two second handle portions extending towards centre from opposite positions of the inner circumstance of the second annular portion.

In some embodiments, there are a plurality of second handle portions, the plurality of second handle portions extending towards centre from spaced and opposite positions of the inner circumstance of the second annular portion.

In some embodiments, the first handle portion is provided with an identifier portion, the identifier portion being configured to detect a torn-apart state of the first release film.

In some embodiments, the base film includes a main body portion and a third handle portion, the third handle portion extending outwards from an outer circumference of the main body portion, the first handle portion of the first release film being located on the third handle portion, and the first handle portion and the third handle portion being adhered through a third adhesive layer.

In another aspect, an embodiment of the present disclosure provides an assembling method. The method includes: providing a film pasting assembly, where the film pasting assembly includes a base film; a first adhesive layer formed annularly and arranged on the base film; a first release film, including a first annular portion and a first handle portion, the first annular portion being adhered to the first adhesive layer, and the first handle portion extending outwards from an outer circumference of the first annular portion; a second adhesive layer arranged on the base film and located in the first adhesive layer; and a second release film, including a second annular portion and a second handle portion, the second annular portion being adhered to the second adhesive layer, and the second handle portion extending inwards from an inner circumference of the second annular portion; the second release film is located on an inner side of the first release film, and a size of an inner circumference of the first release film is equal to that of an outer circumference of the second release film; tearing apart the first release film of the film pasting assembly to expose the first adhesive layer; adhering a magnet to the first adhesive layer; tearing apart the second release film of the film pasting assembly to expose the second adhesive layer; and adhering a coil to the second adhesive layer.

In some embodiments, after adhering the magnet to the first adhesive layer and before tearing apart the second release film of the film pasting assembly, the method further includes: leaving still, where the magnet and the first adhesive layer are adhered fully.

In some embodiments, the base film includes a main body portion and a third handle portion, the third handle portion extending outwards from an outer circumference of the main body portion, the first handle portion of the first release film being located on the third handle portion, and the first handle portion and the third handle portion being adhered through a third adhesive layer.

In some embodiments, the second handle portion is torn apart to drive the second release film to separate the second adhesive layer.

In some embodiments, a notch is formed at a position where the second handle portion and the second annular portion are connected.

In some embodiments, there are two second handle portions, the two second handle portions extending towards centre from opposite positions of the inner circumstance of the second annular portion.

The film pasting assembly provided by the embodiment of the present disclosure may be used for assembling the magnet and the coil. When the first release film is torn apart and the magnet is adhered, the second release film is reserved on the second adhesive layer. The first release film and the second release film may be formed by cutting a same raw material film, which not only saves the cost, but also improves the film tearing success rate and the assembling quality of the product.

BRIEF DESCRIPTION OF DRAWINGS

The embodiment of the present disclosure is described with reference to the accompanying drawings, the above-mentioned and other purposes, features and advantages of the embodiment of the present disclosure will become clearer. In the drawings.

DETAILED DESCRIPTION OF EMBODIMENTS

Description on the present disclosure is made below based on the embodiments, and the present disclosure is not only limited to these embodiments. In the detailed description of the present disclosure below, some specific detailed parts are described in detail. Those skilled in the art may also understand the present disclosure totally without description of the detailed parts. In order to avoid confusion of essence of the present disclosure, known methods, processes, flows, components and circuits are not narrated in detail.

In addition, those of ordinary skill in the art may understand that the drawings provided herein are merely for explanatory purposes rather than being drawn in proportion.

Unless otherwise specified here, similar words such as "include" and "comprise" in the description may be construed as inclusive meaning rather than exclusive or exhaustive meaning. That is to say, it is the meaning of "include, but not limited to".

In description of the present disclosure, it should be understood that terms "first" and "second" are only used for a description purpose rather than being construed to indicate or imply relative importance. In addition, in the description of the present disclosure, unless otherwise specified, "a plurality of" means two or more than two.

Figure 1:
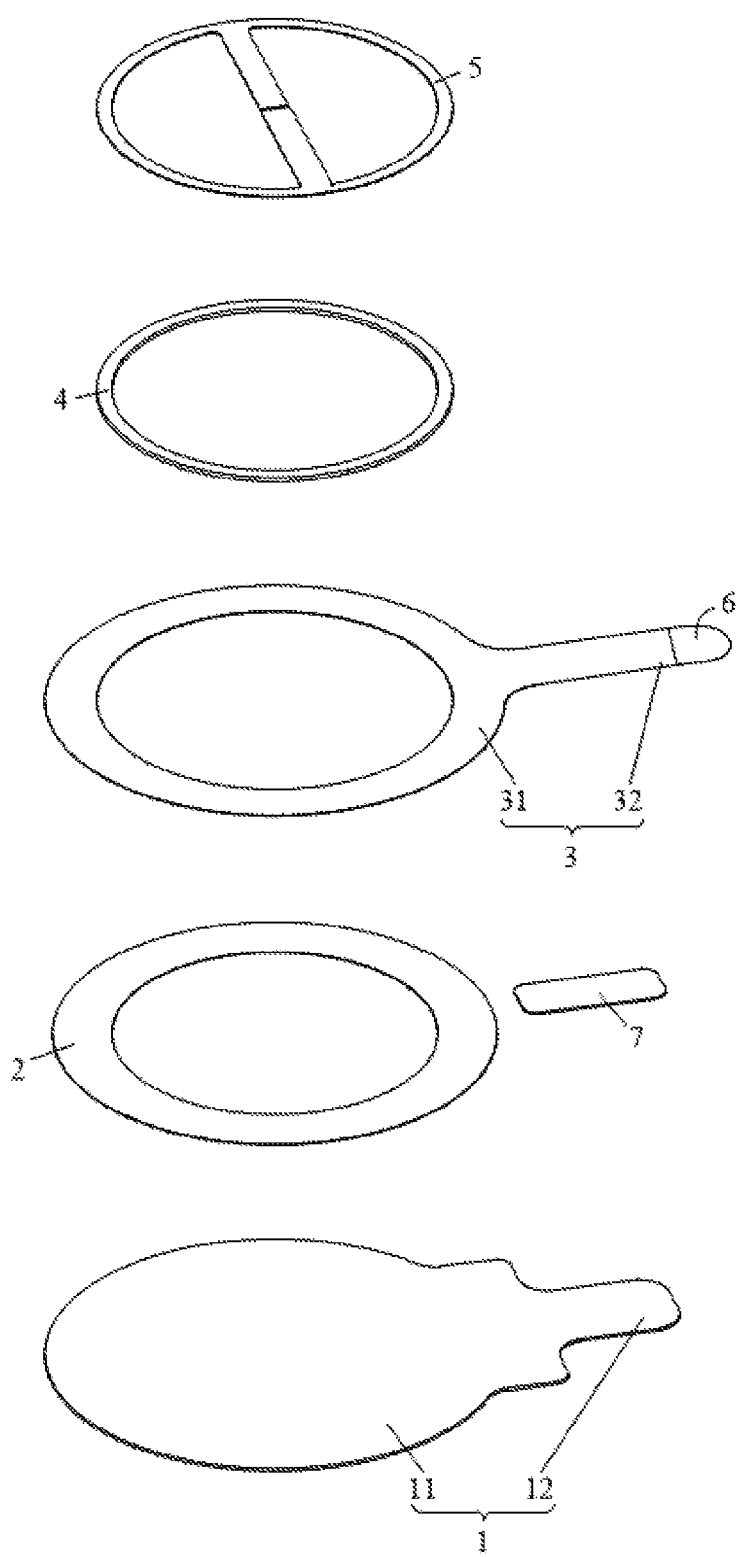
FIG. 1 is a breakdown schematic diagram of a film pasting assembly of an embodiment of the present disclosure.
Figure 2:
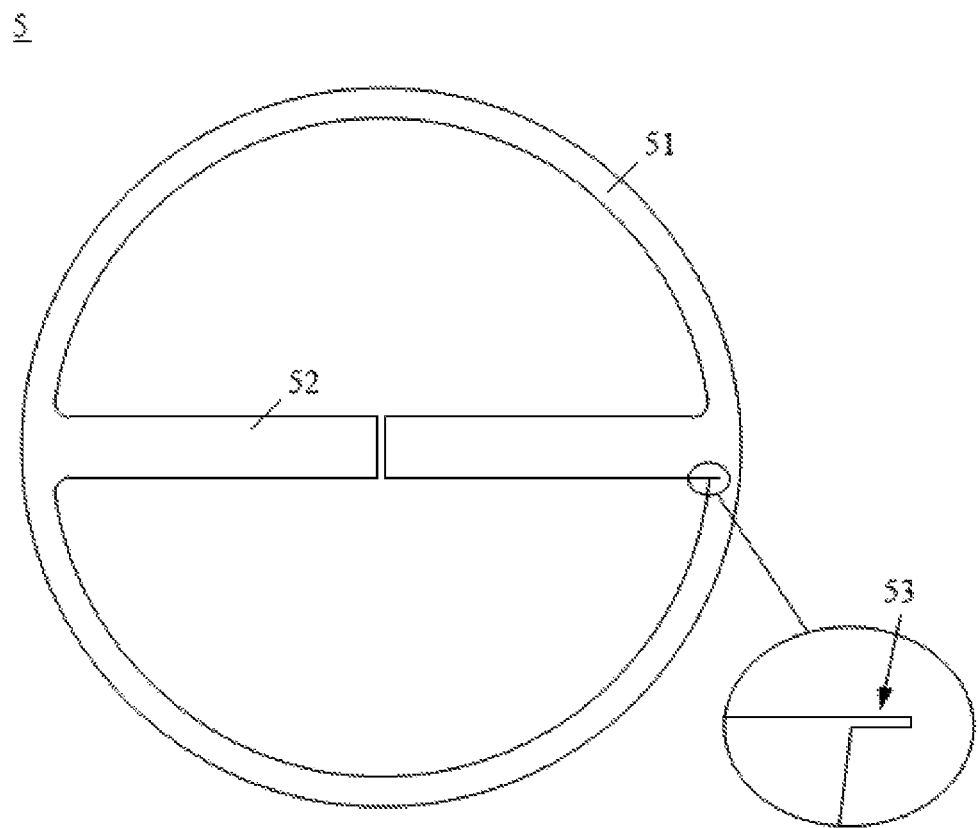
FIG. 2 is a schematic structure diagram of a second release film of an embodiment of the present disclosure.

FIG. 1 and FIG. 2 are schematic diagrams of a film pasting assembly of an embodiment of the present disclosure. The film pasting assembly includes a base film 1, a first adhesive layer 2, a first release film 3, a second adhesive layer 4 and a second release film 5. The first adhesive layer 2 is formed annularly and arranged on the base film 1. The first release film 3 includes a first annular portion 31 and a first handle portion 32, the first annular portion 31 being adhered to the first adhesive layer 2, and the first handle portion 32 extending outwards from an outer circumference of the first annular portion 31. The second adhesive layer 4 is arranged on the base film 1, and is located on the first adhesive layer 2. The second release film 5 includes a second annular portion 51 and a second handle portion 52, the second annular portion 51 being adhered to the second adhesive layer 4, and the second handle portion 52 extending inwards from an inner circumference of the second annular portion 51. In the embodiment, the first adhesive layer 2 and the second adhesive layer 4 may, but not limited to, be formed by a pressure sensitive adhesive (PSA).

The second release film 5 is located on an inner side of the first release film 3, and a size of an inner circumference of the first release film 3 is equal to that of an outer circumference of the second release film 5. The first release film 3 and the second release film 5 may share a same raw material, i.e., they are formed by cutting a same raw material film material, so that the size of the inner circumference of the first release film 3 is equal to that of the outer circumference of the second release film 5. In addition, the thickness of the second adhesive layer 4 is greater than or equal to that of the first adhesive layer 2. In the embodiment, the thickness of the second adhesive layer 4 is greater than that of the first adhesive layer 2, but implementation of the embodiment is not limited.

Advantages are described below in combination with a film pasting assembly in the prior art now.

Figure 3:
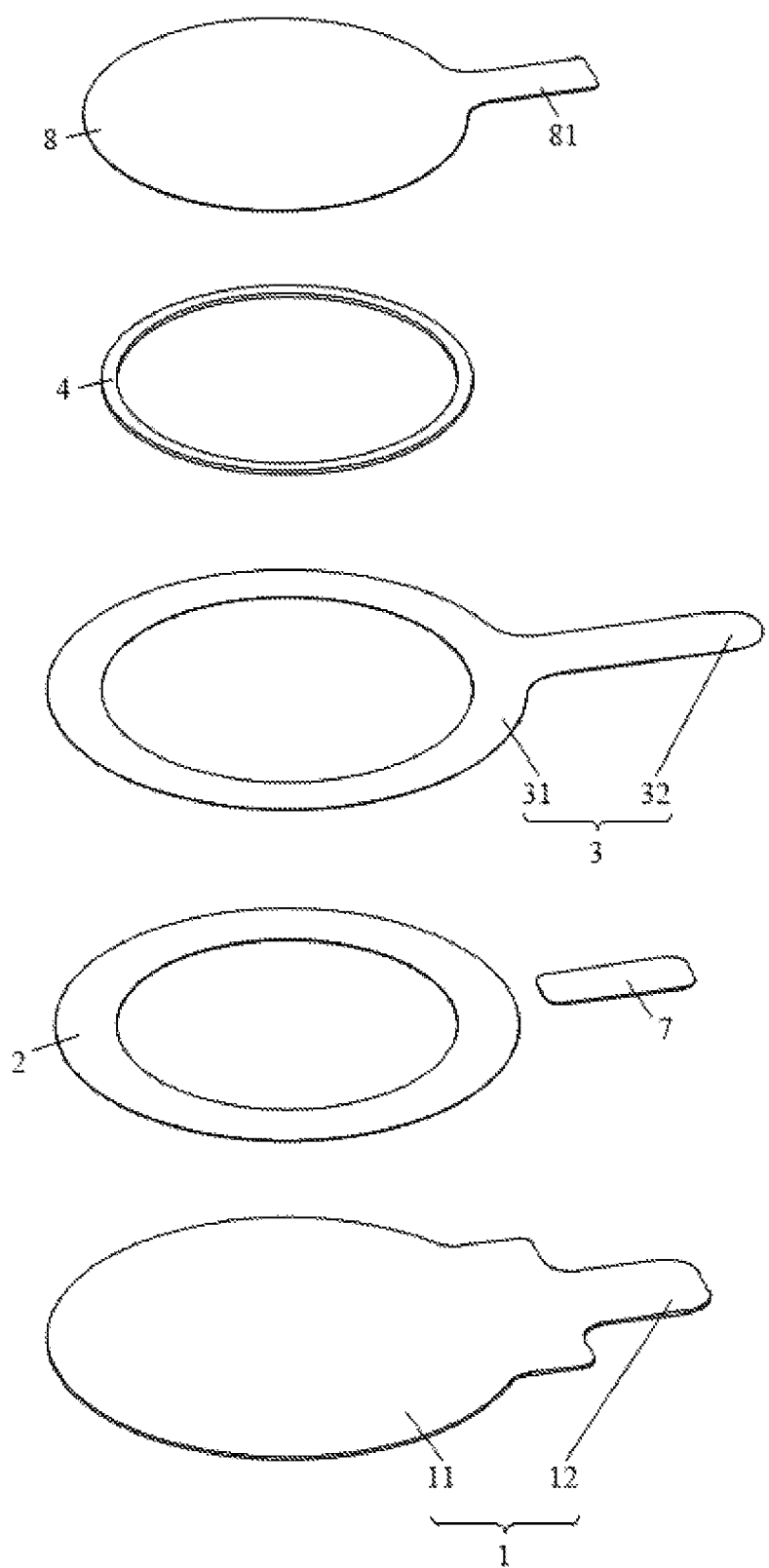
FIG. 3 is a breakdown schematic diagram of an existing film pasting assembly.

FIG. 3 is a schematic diagram of an existing film pasting assembly, including a base film 1, a first adhesive layer 2, a first release film 3, a second adhesive layer 4 and a third release film 8. The base film 1, the first adhesive layer 2, the first release film 3 and the second adhesive layer 4 may have structures same with those of the film pasting assembly of the embodiment. The third release film 8 is provided with a fourth handle portion 81, and the fourth handle portion 81 is superposed on one side of the first handle portion 32 of the first release film 3 in an axial direction (an up-down direction in FIG. 3). In actual production, the first release film 3 is torn apart through the first handle portion 32 first to expose the first adhesive layer 2, the magnet is adhered to the first adhesive layer 2, and then the third release film 8 is torn apart through the fourth handle portion 81 to expose the second adhesive layer 4, and the coil is adhered to the second adhesive layer 4. Therefore, when the first release film 3 is torn apart, as the first handle portion 32 and the fourth handle portion 81 are superposed together, the third release film 8 will be taken away while the first release film 3 is torn apart, so that the first adhesive layer 2 and the second adhesive layer 4 are exposed at the same time. Further, after the magnet is adhered to the first adhesive layer 2, it is usually needed to leave the first adhesive layer 2 still for a period of time, and within the period of time, the second adhesive layer 4 is in an exposed state to lead to viscosity reduction, which is adverse to adhering the coil. Moreover, it is hard to match the size of the outer circumference of the third release film 8 and the size of the outer circumference of the second adhesive layer 4 perfectly, so that the processing difficulty in a die cutting process is high. Meanwhile, it is necessary to process the first release film 3 and the third release film 8 by using two raw material film materials, so that the cost is high and the processing difficulty is high.

The first release film 3 and the second release film 5 of the film pasting assembly of the embodiment are not in superposing relation in the axial direction (an up-down direction in FIG. 1), they do not affect each other during tearing. The second release film 5 is reserved on the second adhesive layer 4 while the first release film 3 is torn apart and the magnet is adhered, so that step correction is ensured. The first release film 3 and the second release film 5 may be processed from the same raw material, so that the cost is saved. The fit sizes of the first adhesive layer 2 and the second adhesive layer 4 may be mastered more precisely.

As shown in FIG. 1 and FIG. 2, in the embodiment, the first adhesive layer 2, the first annular portion 31, the second adhesive layer 4 and the second annular portion 51 all are ring-shaped, which corresponds to the to-be-assembled magnet and coil which are usually ring-shaped. In other embodiments, the first adhesive layer 2, the first annular portion 31, the second adhesive layer 4 and the second annular portion 51 may further be elliptical ring-shaped, racetrack-shaped or other ring-shaped.

As shown in FIG. 1 and FIG. 2, in the embodiment, the size of the inner circumference of the first annular portion 31 is equal to that of the inner circumference of the first adhesive layer 2, and the size of the outer circumference of the first annular portion 31 is equal to that of the outer circumference of the first adhesive layer 2. Therefore, the first annular portion 31 and the first adhesive layer 2 are superposed in the axial direction. When the first release film 3 is not torn apart, the first release film 3 just covers the first adhesive layer 2 completely, which may improve the structural compactness, avoid mis-adhesion and further improve the film tearing success rate effectively.

As shown in FIG. 1 and FIG. 2, in the embodiment, the size of the inner circumference of the second adhesive layer 4 is equal to that of the inner circumference of the second annular portion 51, and the size of the outer circumference of the second adhesive layer 4 is equal to that of the inner circumference of the second annular portion 51. Therefore, the second annular portion 51 and the second adhesive layer 4 are superposed in the axial direction. The second release film 5 just covers the second adhesive layer 4 completely, which may improve the structural compactness, avoid mis-adhesion and further improve the film tearing success rate effectively.

Figure 4:
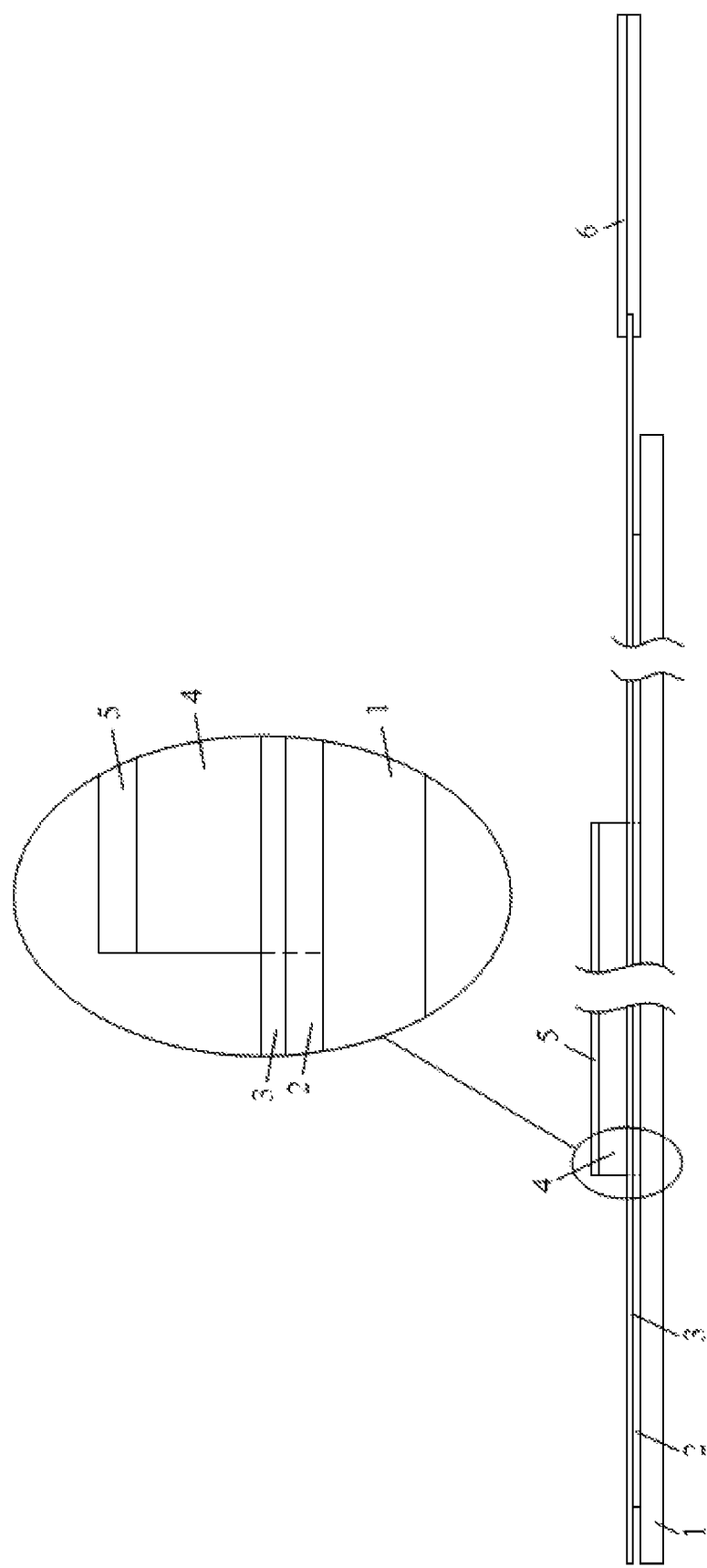
FIG. 4 is a front view of a film pasting assembly of an embodiment of the present disclosure.

As shown in FIG. 1, FIG. 2 and FIG. 4, in the embodiment, the size of the outer circumference of the second adhesive layer 4 is equal to that of the inner circumference of the first adhesive layer 2. Therefore, when the first release film 3 and the second release film 5 are respectively adhered to the first adhesive layer 2 and the second adhesive layer 4, there is nearly no gap between the inner circumference of the first release film 3 and the outer circumference of the second release film 5 in a radial direction, and they may cover an adhesive surface completely.

In FIG. 4, a part of structures is omitted with break lines, so as to solve the problem that a transverse size of FIG. 4 is much larger than a vertical size.

As shown in FIG. 4, in the embodiment, the thickness of the second adhesive layer 4 is greater than that of the first adhesive layer 2. The first release film 3 is adhered to the first adhesive layer 2, and the second release film 5 is adhered to the second adhesive layer 4, so that the first release film 3 and the second release film 5 are located at different heights. When they are torn apart, it is more easily to grasp the first handle portion 32 or the second handle portion 52 and tear them apart. Meanwhile, there is a height difference between the first adhesive layer 2 and the second adhesive layer 4 that form a stepped structure. The stepped structure is a stepped adhesion area formed by a top adhesion surface of the first adhesive layer 2 and a lateral adhesion surface of the second adhesive layer 4, so that it plays a stable limiting and positioning role when the magnet is assembled, and it is more easily to assemble the magnet and assemble the coil subsequently.

As shown in FIG. 2, in the embodiment, a notch 53 is formed at a position where the second handle portion 52 and the second annular portion 51 are connected, the notch 53 is located in one side of the second handle portion 52, and there is no notch 53 in the other side of the second handle portion 52. That is, the second handle portion 52 and the second annular portion 51 are different in strength on two sides of the connecting position, and the side with the notch 53 is poor in strength. When the second release film 5 is torn apart, the second handle portion 52 applies a force along one side deviated to the notch 53 to lead to tear of one side of the notch 53, and then the second release film 5 is torn apart gradually along the circumferential direction of the second annular portion 51.

In other embodiments, there may be two notches 53 respectively located on two sides of the connecting position of the second handle portion 52 and the second annular portion 51, so that the second handle portion 52 applies the force to either side to drive the second release film 5 to be torn apart. Otherwise, there may be no notches 53, so that the second handle portion 52 applies the force radially to further drive the second release film 5 to be torn apart.

As shown in FIG. 2, in the embodiment, there are two second handle portions 52 extending towards centre from positions opposite the inner circumference of the second annular portion 51. In other words, initial positions of the two second handle portions 52 are opposite at 180° on the inner circumference of the second annular portion 51, and the two second handle portions 52 extend towards centre, respectively. Optionally, extension lengths of the two second handle portions 52 are approximately a length of a radius of the inner circumference of the second annular portion 51, i.e., extension tail ends of the two second handle portions 52 nearly contact each other. Therefore, the second release film 5 may be torn apart by any second handle portion 52, so that the operating flexibility is improved.

In an optional implementation mode, the two second handle portions 52 are connected at the extension tail ends, or rather, the two second handle portions 52 are connected integrally. In other words, the second handle portion 52 is a chord of a circle by taking the inner circumference of the second annular portion 51 as a circumference. Therefore, the second handle portion 52 applies the force along the axial direction of the second annular portion 51 to further drive the second release film 5 to be torn apart.

Figure 5:
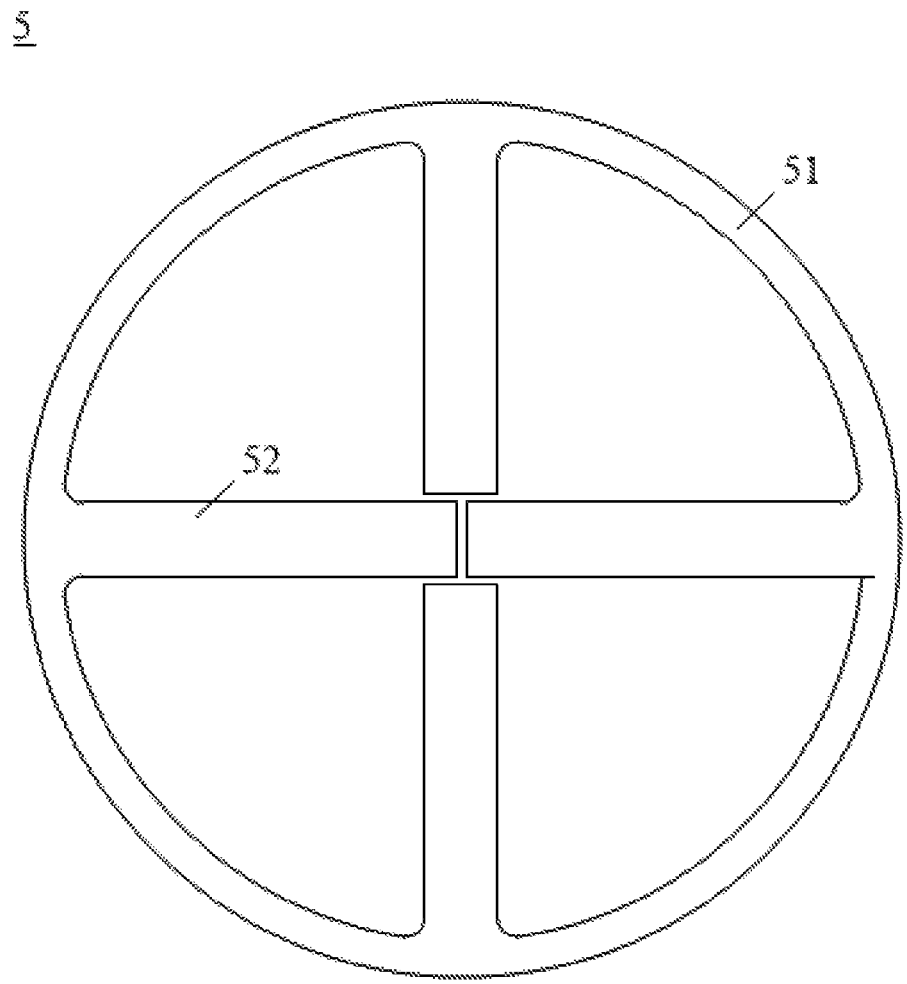
FIG. 5 is a schematic structure diagram of a second release film of another embodiment of the present disclosure.

In another optional implementation mode, as shown in FIG. 5, there are a plurality of second handle portions 52, the plurality of second handle portions 52 extending towards centre from spaced and opposite positions of the inner circumstance of the second annular portion 51. In the implementation mode, a role of tearing the second release film 5 apart by means of any one second handle portion 52 may be played as well.

As shown in FIG. 1 and FIG. 4, in the embodiment, the first handle portion 32 is provided with an identifier portion 6 configured to detect a torn-apart state of the first release film 3. The identifier portion 6 may be identified by an automatic machine, so as to determine whether the first release film 3 is torn apart. The identifier portion 6 may have information capable of being identified by an identification device, for example, a bar code, a QR code or other identification information. Optionally, the identifier portion 6 may be located at the tail end of the first handle portion 32. In the embodiment, the identifier portion 6 may, but not limited to, be coating, a sticker and materials with different colors capable of providing an identifier to detect the torn-apart state of the first release film 3.

As shown in FIG. 1 and FIG. 4, in the embodiment, the base film 1 includes the main body portion 11 and the third handle portion 12, the third handle portion 12 extending outwards from an outer circumference of the main body portion 11. In an axial direction, the first handle portion 32 of the first release film 3 is superposed on one side of the third handle portion 12, and the first handle portion 32 is adhered to the third handle portion 12 through a third adhesive layer 7. A size of an outer contour of the main body portion 11 is larger than or equal to a size of the outer circumference of the first adhesive layer 2, so that the first adhesive layer 2 and the release film on the first adhesive layer 2 and the like may be intactly placed on the base film 1. Therefore, the film pasting assembly is of integrity, and is easier to move among steps. Optionally, the outer contour of the main body portion 11 is round, too, and the size thereof is slightly larger than that of the first adhesive layer 2.

The film pasting assembly provided by the embodiment may be used for assembling the magnet and the coil. When the first release film is torn apart and the magnet is adhered, the second release film is reserved on the second adhesive layer. The first release film and the second release film may be formed by cutting a same raw material film, which not only saves the cost, but also improves the film tearing success rate and the assembling quality of the product.

Figure 6:
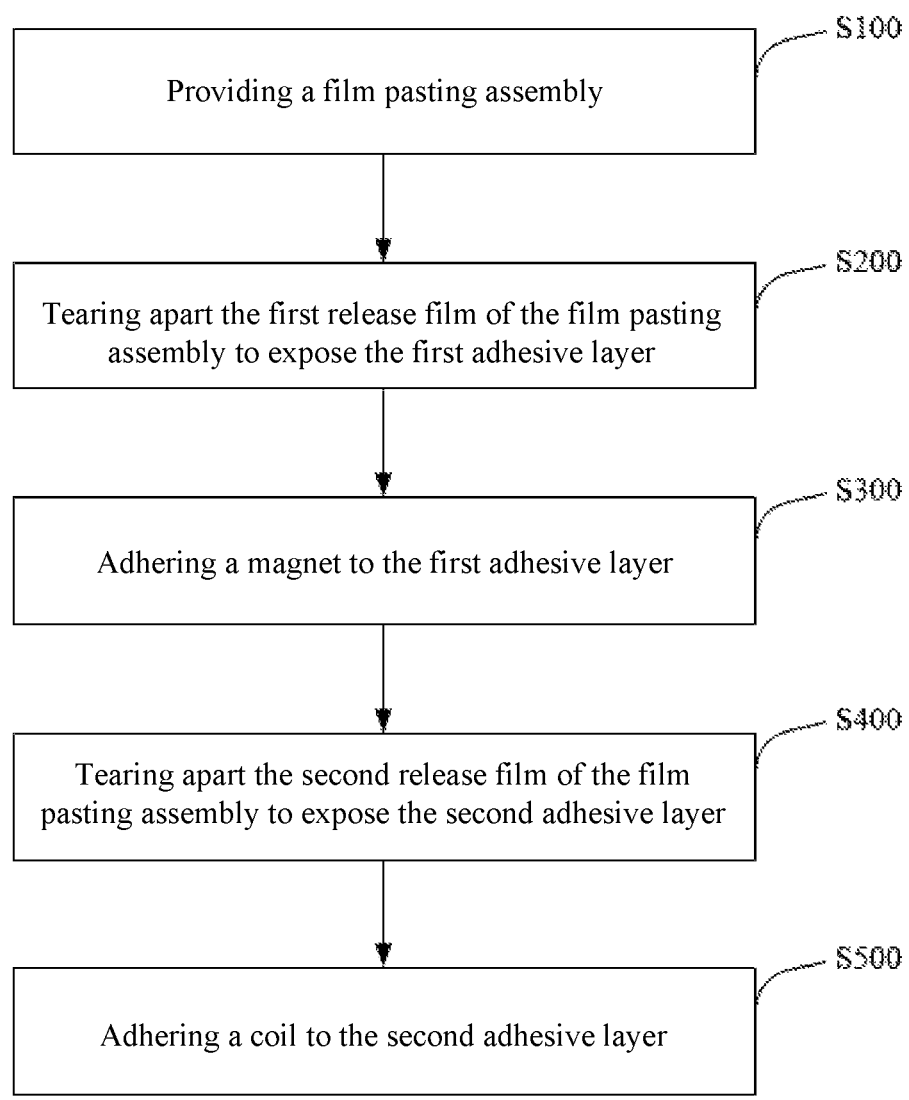
FIG. 6 and FIG. 7 are schematic diagrams of an assembling method of an embodiment of the present disclosure.

FIG. 6 is a schematic diagram of an assembling method of an embodiment of the present disclosure. The assembling method may be used for assembling the magnet and the coil. The assembling method includes:

S100, providing a film pasting assembly. The structure of the film pasting assembly may be the same as that of any one film pasting assembly provided by the embodiment of the present disclosure.

S200, tearing apart the first release film 3 of the film pasting assembly to expose the first adhesive layer 2. The first release film 3 may be torn apart by either an automatic device or a manual operation through the first handle portion 32.

S300, adhering a magnet to the first adhesive layer 2.

S400, tearing apart the second release film 5 of the film pasting assembly to expose the second adhesive layer 4. The second release film 5 may be torn apart by through the second handle portion 51. In the step, the second handle portion 52 is torn apart to drive the second release film 5 to be separated from the second adhesive layer 4, where the second handle portion 52 and the second annular portion 51 are different in strength on two sides of the connecting position, and the side with the notch 53 is poor in strength. In S400, the second handle portion 52 applies a force along one side deviated to the notch 53 to lead to tear of one side of the notch 53, and then the second release film 5 is torn apart gradually along the circumferential direction of the second annular portion 51.

S500, adhering a coil to the second adhesive layer 4.

The magnet is an annular magnet, and the shape and size of the cross section of the magnet are the same with those of the first adhesive layer 2, so that the magnet may be completely adhered to the first adhesive layer 2. The coil is an annular coil, and the shape and size of the cross section of the coil are the same with those of the second adhesive layer 4, so that the coil may be completely adhered to the second adhesive layer 4. In other words, after the magnet is adhered to the first adhesive layer 2, the first adhesive layer 2 is completely covered by the magnet, the second adhesive layer 4 has no exposed parts, and the coil and the second adhesive layer 4 have no exposed parts as well.

Figure 7:
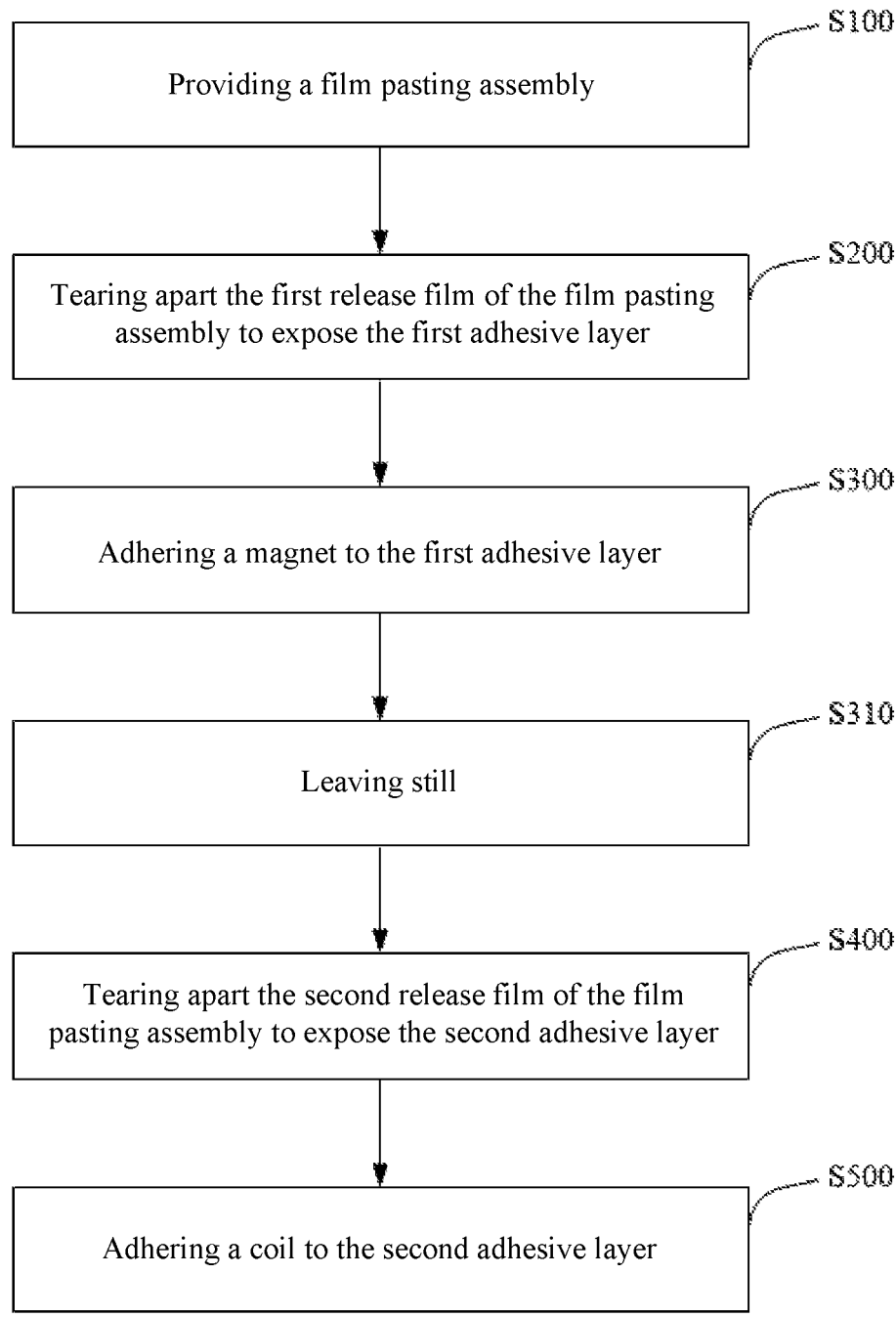

As shown in FIG. 7, in the embodiment, after S300 and before S400, the method further includes:

S310, leaving still, where the magnet and the first adhesive layer 2 are adhered fully.

The leaving time may be determined dependent on actual situation, and adhesion of the magnet and the first adhesive layer 2 may be assisted by adopting processes such as pressure maintaining before leaving still.

The assembling method provided by the embodiment is used for assembling the magnet and the coil based on the film pasting assembly, which may optimize the assembling steps, improve the assembling success rate of the magnet and the coil and improve the yield of the product.

The above is merely preferred embodiments of the present disclosure and is not used to limit the present disclosure. For those skilled in the art, various alternations and changes may be made on the present disclosure. Any modification, equivalent replacement, improvement, etc. made within the spirit and principle of the present disclosure may be regarded as within the protection scope of the present disclosure.

The invention claimed is:

1. A film pasting assembly for assisting to assemble a coil and a magnet, the film pasting assembly comprising:
   a base film;
   a first adhesive layer formed annularly and arranged on the base film;
   a first release film, comprising a first annular portion and a first handle portion, the first annular portion being adhered to the first adhesive layer, and the first handle portion extending outwards from an outer circumference of the first annular portion;
   a second adhesive layer arranged on the base film; and
   a second release film, comprising a second annular portion and a second handle portion, the second annular portion being adhered to the second adhesive layer, and the second handle portion extending inwards from an inner circumference of the second annular portion,
   wherein the second release film is located on an inner side of the first release film, and a size of an inner circumference of the first annular portion is equal to that of an outer circumference of the second annular portion;

wherein, the first release film is a removable film disposed on the first adhesive layer, and the second release film is a removable film disposed on the second adhesive layer; the first release film is configured to be torn apart to expose the first adhesive layer on the base film, and the second release film is configured to be torn apart to expose the second adhesive layer on the base film.

2. The film pasting assembly according to claim 1, wherein the first adhesive layer comprises a first side away from the base film, and the second adhesive layer is arranged on the first side.

3. The film pasting assembly according to claim 1, wherein the size of the inner circumference of the first annular portion is equal to that of the inner circumference of the first adhesive layer, and the size of the outer circumference of the first annular portion is equal to that of the outer circumference of the first adhesive layer.

4. The film pasting assembly according to claim 1, wherein the second adhesive layer is formed annularly, and the size of the inner circumference of the second adhesive layer is equal to that of the inner circumference of the second annular portion, and the size of the outer circumference of the second adhesive layer is equal to that of the outer circumference of the second annular portion.

5. The film pasting assembly according to claim 1, wherein the second adhesive layer is formed annularly, and the size of the outer circumference of the second adhesive layer is equal to that of the inner circumference of the first adhesive layer.

6. The film pasting assembly according to claim 1, wherein the first adhesive layer, the second adhesive layer, the first annular portion and the second annular portion are ring-shaped.

7. The film pasting assembly according to claim 1, wherein the second adhesive layer is greater than or equal to the first adhesive layer in thickness.

8. The film pasting assembly according to claim 1, wherein a notch is formed at a position where the second handle portion and the second annular portion are connected.

9. The film pasting assembly according to claim 1, wherein there are two second handle portions, the two second handle portions extending towards centre from opposite positions of the inner circumstance of the second annular portion.

10. The film pasting assembly according to claim 8, wherein there are two second handle portions, the two second handle portions extending towards centre from opposite positions of the inner circumstance of the second annular portion.

11. The film pasting assembly according to claim 1, wherein there are a plurality of second handle portions, the plurality of second handle portions extending towards centre from spaced and opposite positions of the inner circumstance of the second annular portion.

12. The film pasting assembly according to claim 8, wherein there are a plurality of second handle portions, the plurality of second handle portions extending towards centre from spaced and opposite positions of the inner circumstance of the second annular portion.

13. The film pasting assembly according to claim 1, wherein the first handle portion is provided with an identifier portion, the identifier portion being configured to detect a torn-apart state of the first release film.

14. The film pasting assembly according to claim 1, wherein the base film comprises a main body portion and a third handle portion, the third handle portion extending outwards from an outer circumference of the main body portion, the first handle portion of the first release film being located on the third handle portion, and the first handle portion and the third handle portion being adhered through a third adhesive layer.

* * * * *